United States Patent [19]
Stevenson

[11] 4,091,849
[45] May 30, 1978

[54] SAFE TANK FILLING APPARATUS
[75] Inventor: James S. Stevenson, Oakland, Calif.
[73] Assignee: Terminator Products, Inc., Oakland, Calif.
[21] Appl. No.: 770,366
[22] Filed: Feb. 22, 1977
[51] Int. Cl.² .............................................. B65B 3/04
[52] U.S. Cl. .................................. 141/302; 137/519.5
[58] Field of Search ............... 141/301, 302, 303, 392, 141/374; 137/519.5, 202, 218

[56] References Cited
U.S. PATENT DOCUMENTS

| 954,178 | 4/1910 | Fowler | 137/519.5 |
| 1,700,603 | 1/1929 | Vreeland et al. | 137/519.5 |

Primary Examiner—Houston S. Bell

[57] ABSTRACT

Safe tank filling apparatus primarily for pesticide tank use, comprising a tank filling tube and a reverse flow prevention means associated therewith which includes a multiple valve assembly made up of a housing of three sections, two of which provide a flow through passageway to the filling tube and in which is located a one way valve assembly permitting flow through to the filling tube but not in reverse, and a vent valve assembly in the remaining housing section held in closed position in response to pressure within the housing, but openable in response to development of a partial vacuum condition within the housing.

10 Claims, 2 Drawing Figures

SAFE TANK FILLING APPARATUS

My invention relates to tank filling apparatus, and more particularly, to apparatus for the safe filling of a tank in which hazardous liquids such as pesticides may be involved, and will be described with respect to the handling of such materials.

The tanks under consideration are usually mounted on pest control trucks, and water for use in the preparation of a pesticide solution is usually drawn from a household or equivalent water supply through a hose, which on most occasions in accordance with general practice, has its discharge end dropped into the tank. When the desired amount of water has been added to the tank, the water supply is shut off, and an appropriate amount of the pesticide is added to provide the mixture for use at the intended job site. Residual pesticide and/or pesticide solution from a prior job generally exist in the tank when water is added in the preparation of a fresh supply.

Many such pesticides are quite hazardous to an operator if brought into contact therewith, and also present a danger to the water supply source, should the supply source accidently or otherwise lose pressure. This latter situation could result in a siphoning action, which could produce a reverse flow from the tank into the household supply system. The dangers and risks accompanying the use of such hazardous materials are so great that legal regulations dictate safety precautions to be taken under the circumstances, to protect not only the operator but the source of water supply.

One such precautionary measure dictates that the discharge end of the water supply hose shall be maintained in a spaced relationship to the filling opening to the tank, whereby reverse flow due to siphoning action or otherwise, cannot possibly occur. This procedure, however has serious drawbacks in that the water, in striking the surface of the liquid in the tank, can, not only cause splashing which could result in some of the tank liquid exiting through the filling opening and exposing the operator to contact, but the water in so entering the tank, can entrain air and cause foaming of the liquid in the tank, which is quite undesirable.

Among the objects of the present invention are:

(1) To provide a novel and improved filling apparatus for tanks, which can function with safety to an operator, despite involvement of hazardous liquids.

(2) To provide a novel and improved tank filling apparatus for use in association with hazardous chemicals, and which will prevent backflow of liquid from the tank.

(3) To provide a novel and improved tank filling apparatus which will enable bottom filling to avoid splashing and/or foaming.

(4) To provide a novel and improved tank filling apparatus which will prevent development of a vacuum condition in the tank, and thereby avoid probability of collapsing of the tank during dispensing of the liquid contents from the tank.

(5) To provide a novel and improved tank filling apparatus which will be extremely simple in construction and design, and foolproof in operation.

Additional objects of my invention will be brought out in the following description of a preferred embodiment of the same, taken in conjunction with the accompanying drawings, wherein.

Figure 1:
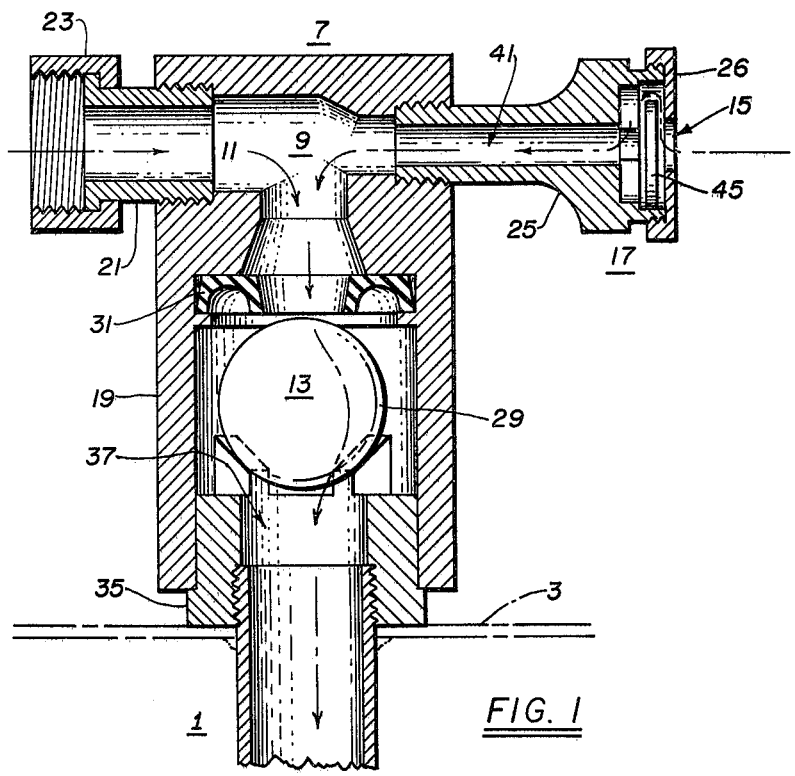
FIG. 1 is a view in section through tank filling apparatus of the present invention.
Figure 2:
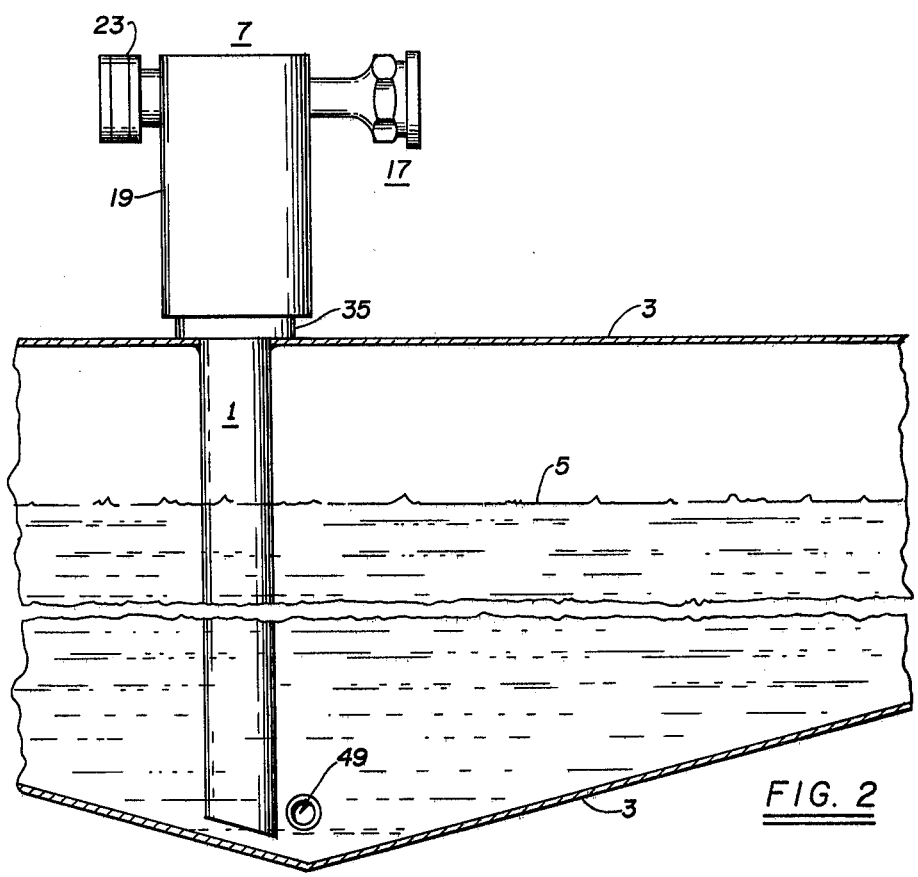
FIG. 2 is a view in section, depicting an installation in a tank, of the tank filling apparatus of the present invention.

Referring to the drawings for details of the invention in its preferred form, the same comprises a filling tube 1 extending into a tank 3 to a point substantially below fill level 5 in the tank, preferably terminating adjacent the bottom, and a multiple valve assembly 7 mounted on the intake end of the filling tube and comprising a housing 9 affixed to the filling tube and including a through flow passageway 11 in communication with the filling tube, and a fill valve assembly 13 in the flow passageway, adapted to permit flow to the filling tube, but block reverse flow through said passageway.

The filling tube is preferably welded to the top of the tank, with a threaded intake end extending above the top for mounting of the multiple valve assembly.

A vent 15 is provided in the housing and a normally open valve assembly 17 is disposed at the vent and is responsive to liquid pressure in the housing for blocking the vent during the presence of such liquid, but is openable in response to a condition of vacuum in such housing.

More specifically, the housing may be said to involve three sections, eg, a main flow section 19, a lateral section 21 terminating in a hose fitting 23, and a third section 25 inclusive of a cap 26 in which the vent 15 is provided, said third section serving to house the vent valve assembly 17. The main control valve section 19 and the section 21 terminating in the hose fitting together provide the flow passageway through to the filling tube.

This main valve section houses the one way valve assembly 13, which comprises a ball valve 29, preferably one of lower specific gravity than water, such as a light weight plastic ball comparable to a ping pong ball, and a valve seat formed by a ring seal 31, preferably U-cup seal supported in a circumferential groove preformed in the interior wall of the control valve section of the housing, immediately above the ball valve.

The ball valve is retained in its associated housing section by a retainer plug 35 having an axial passage therethrough surrounded at its interior or valve supporting end by a plurality of radial grooves 37 to permit flow of liquid around the ball valve to the filling tubes.

The vent valve assembly housing section 25 may be in the form of a fitting threaded into the ball valve section and provided with an axial passageway 41 in full communication with the passageway 11 through the housing. At its exterior end, this fitting is recessed to receive a valve disc 45 of relatively soft rubber or equivalent material and of a diameter greater than the diameter of either the passageway 41 or the vent 15. The floor of recess is formed with radial grooves extending beyond the edge of the disc to permit air flow into the axial passageway 41 around the rim of the valve disc when such valve disc is in contact with the floor of the recess.

Upon reduction of pressure within the housing, and particularly when such pressure becomes a vacuum condition, external atmospheric pressure will drive the valve disc away from the vent opening to a position against the floor of the recess to permit inflow of air.

It will be appreciated from the foregoing detailed description of the invention it its preferred embodiment, that water entering the housing through a hose connected to the hose fitting, can readily find its way to the filling tube and then into the tank, supplying liquid to the tank at a point below the rising liquid level therein. Consequently no foaming or splashing of the liquid in the tank can be expected to develope.

Because of the slight resistance offered by the ball valve to such inflow of liquid, the housing will fill with liquid and bring pressure to bear against the vent valve disc, sufficient to close the vent and preclude escape of liquid during the filling operation period.

In the course of the filling of the tank, should the source of liquid being supplied to the tank, lose its pressure sufficient to otherwise result in a backflow of liquid from the tank and ultimately produce a siphoning of the liquid therefrom, the ball valve will respond to such tendency toward a backflow and seal the flow passageway by engaging the U-cap seal.

At the same time, any tendency for a vacuum condition to develop above the ball valve, due to a drop in pressure at the liquid source, will result in the vent valve opening to take in air and relieve such vacuum condition.

Thus, even should the ball valve assembly leak, or even completely fail for some reason or other to block backflow of liquid, the opening of the vent valve will break the suction at that point and preclude siphoning of the liquid from the tank. Thus a double protection is provided.

The vent valve assembly performs an additional safety function, in that it will prevent probable collapse of the tank in the event that, during dispensing of the tank contents, a condition of sub-atmospheric pressure would otherwise develope therein. Because of the presence of the vent valve assembly in the tank filling apparatus, such valve assembly will permit entrance of air into the tank under such conditions to preclude the development of such sub-atmospheric pressure therein.

From the foregoing description of my invention in its preferred form, it will be apparent that it fulfills all the objects attributed thereto, and while I have illustrated and described the preferred form in great detail, it is apparent that the same is subject to alteration and modification without departing from the underlying principles involved, and I, accordingly, do not desire to be limited in my protection to the specific details illustrated and described, except as may be necessitated by the appended claims. I claim:

1. A safe tank-filling apparatus installation comprising a tank having a bottom and a top, a filling tube extending down into said tank to substantially the bottom of said tank, and a multiple valve assembly affixed to the upper end of said filling tube and extending above the top of said tank, said multiple valve assembly including a housing mounted on the upper end of said filling tube, said housing including a flow passageway in communication with said filling tube, a fill valve assembly in said flow passageway adapted to permit flow to said filling tube but block reverse flow in said passageway, a vent in said housing and normally open valve means at said vent and responsive to liquid in said housing for blocking said vent during presence of such liquid.

2. A safe tank filling apparatus installation in accordance with claim 1, characterized by said housing including three sections all flow connected, with two of said sections forming the flow passageway to said filling tube, and said vent being in the remaining section.

3. A safe tank filling apparatus installation in accordance with claim 2, characterized by said fill valve assembly including a valve seat in one of the two housing sections forming said flow passageway, and a valve in said valve seat housing section in open relationship to said valve seat during liquid flow to said filling tube and adapted to engage said valve seat in response to reverse flow of liquid in said passageway, to block such reverse flow of liquid.

4. A safe tank filling apparatus installation in accordance with claim 3, characterized by said valve seat including a ring seal supported in a circumferential groove in the interior wall of the housing section in which it is located, said valve comprising a ball of lower specific gravity than water, and means for normally supporting said ball in said flow passageway below said valve seat in proximity thereto.

5. A safe tank filling apparatus installation in accordance with claim 4, characterized by said means for supporting said ball valve including a retainer plug having an axial passageway therethrough and surrounded at the interior or ball supported end of said plug by a plurality of radial grooves to permit flow of liquid around said ball to said filling tube.

6. A safe tank filling apparatus comprising a filling tube adapted to extend into a tank to a point substantially below fill level in said tank, a multiple valve assembly comprising a housing mounted on the upper end of said filling tube, said housing including a flow passageway in communication with said filling tube, a fill valve assembly in said flow passageway adapted to permit flow to said filling tube but block reverse flow in said passageway, a vent in said housing and normally open valve means at said vent and responsive to liquid in said housing for blocking said vent during presence of such liquid.

7. A safe tank filling apparatus in accordance with claim 6, characterized by said housing including three sections all flow connected, with two of said sections forming the flow passageway to said filling tube, and said vent being in the remaining section.

8. A safe tank filling apparatus in accordance with claim 7, characterized by said fill valve assembly including a valve seat in one of the two housing sections forming said flow passageway, and a valve in said valve seat housing section during liquid flow to said filling tube and adapted to engage said valve seat in response to reverse flow of liquid.

9. A safe tank filling apparatus in accordance with claim 8, characterized by said valve seat including a ring seal supported in a circumferential groove in the interior wall of the housing section in which it is located, said valve comprising a ball of lower specific gravity than water, and means for normally supporting said ball in said flow passageway below said valve seat in proximity thereto.

10. A safe tank filling apparatus in accordance with claim 9, characterized by said means for supporting said ball valve including a retainer plug having a axial passageway therethrough and surrounded at the interior or ball supporting end of said plug by a plurality of radial grooves to permit flow of liquid around said ball to said filling tube.

* * * * *